Patented Nov. 23, 1937

2,100,242

UNITED STATES PATENT OFFICE 2,100,242

PREPARATION OF 2-CHLORO-5-AMINO-BENZOIC ACID

Robert Freeman Deese, Jr., Wilmington, Del., assignor to E. I. du Pont de Nemours & Company, Wilmington, Del., a corporation of Delaware No Drawing. Application June 5, 1936,
Serial No. 83,812

5 Claims. (Cl. 260—109)

This invention relates to a process for the preparation of 2-chloro-5-amino-benzoic acid by the nitration of ortho-chloro-benzoic acid and the reduction of the resulting nitro body to the amine, and more particularly to an improved method for the isolation of the 2-chloro-5-amino-benzoic acid from any impurities formed during this process.

Hubner and Biederman, Annalen 147, 264 (1868), and Hubner, Annalen 222, 198 (1883) prepared 2-chloro-5-amino-benzoic acid by the reduction of 2-chloro-5-nitro-benzoic acid with zinc and hydrochloric acid. Neither of them gave any definite method of isolation other than by partial neutralization of a basic solution of the amino acid and separation of the resulting precipitate. Bamberger, Berichte 35, 3701–3703 (1902) oxidized 2-chloro-5-acetamino-toluene with potassium permanganate as the oxidizing agent. He then hydrolyzed the acetyl compound to obtain the 2-chloro-5-amino-benzoic acid.

According to German Patent 106,510, Kalle & Company, (1899), 2-chloro-5-nitro-benzoic acid was prepared by dissolving ortho-chloro-benzoic acid in concentrated sulfuric acid and adding solid potassium nitrate at 15°–20° C. Holleman and Bruyn, Rec. Trav. Chim. 20, 208 (1901), nitrated ortho-chloro-benzoic acid at room temperature with concentrated nitric acid and obtained a mixture of 2-chloro-5-nitro-benzoic acid and 2-chloro-3-nitro-benzoic acid, the main portion of which was 2-chloro-5-nitro-benzoic acid. Hubner, Annalen 222, 195 (1883) nitrated one part of ortho-chloro-benzoic acid with five parts of concentrated nitric acid to obtain a mixture of 2-chloro-5-nitro-benzoic acid and 2-chloro-3-nitro-benzoic acid and, also, some dinitro-chloro-benzoic acid. In all of these preparations, the temperature of the nitration was given as room temperature or at 15°–20° C., but never any lower.

This invention has as an object a new and improved process for preparing and isolating 2-chloro-5-amino-benzoic acid in a high state of purity. A further object is the provision of a new and improved process for the nitration of ortho-chloro-benzoic acid to give 2-chloro-5-nitro-benzoic acid. Other objects will appear hereinafter.

These objects are accomplished, by the nitration of ortho-chloro-benzoic acid, preferably dissolved in concentrated sulfuric acid, with mixed acids (e. g., solutions of nitric acid in concentrated sulfuric acid), preferably at a temperature below 5° C., e. g., 0° C. to 5° C., by the reduction of the resulting chloro-nitro-benzoic acid, preferably in an iron reduction medium, to the chloro-amino-benzoic acid and by the subsequent isolation of the 2-chloro-5-amino-benzoic acid after removal of the iron sludge by adjusting the pH of the solution within the range of 2.5 to 3.5, preferably 2.8 to 3.2, cooling below ordinary room temperature, preferably to 10° C. to 15° C., and separating the product.

While the invention is concerned primarily with the isolation of 2-chloro-5-amino-benzoic acid in a pure form, the other steps, particularly the method of preparation of the nitro body from which the amine is made, are contributing factors and, therefore, are included within the scope of the invention.

The invention will be further illustrated by the following examples in which the quantities are stated in parts by weight.

EXAMPLE I

Nitration

One hundred fifty-seven (157) parts of ortho-chloro-benzoic acid were dissolved in 800 parts of sulfuric acid (96%) by heating the mixture to 40° C. The solution was cooled to 0° C., and 212 parts of mixed acid containing 31.22% HNO₃, 58.78% H₂SO₄ and 10% H₂O, were added in a period of one and one-half hours keeping the temperature between 0° C. and 5° C. throughout the addition. Some solid nitro body precipitated during the addition of the mixed acid. The slurry was agitated for five and one-half hours at 0° C. to 5° C. and then the whole mass was drowned in 1000 parts of ice and 500 parts of water. The drowned mass was cooled to 25° C. and filtered. The precipitate was washed and dried. Dry weight 209 parts. Melting range 149° C. to 154° C.

Reduction

One hundred five (105) parts of the above product were added slowly over a period of four hours to a liter of boiling water containing 100 parts of iron filings and 5 parts of glacial acetic acid. The mixture was kept at 95°–100° C. throughout the addition of the nitro body and was held at this temperature three hours longer. A good blue spot was always obtained with potassium ferricyanide indicating the presence of ferrous ions during the reduction. The mixture was then neutralized with solid sodium carbonate (Na2CO3) until alkaline to Brilliant Yellow paper and boiled for thirty minutes before filtering. The precipitate was washed with water and the filtrate and washings were combined. Ten (10) parts of NaHSO3 were added to decolorize the solution. The whole solution of the amines was evaporated to 12° Baumé, acidified with hydrochloric acid to a pH of about 3.0, cooled to 10° C., and filtered. The dry solid weighed 60 parts and had a melting point of 186° C. The pure compound, 2-chloro-5-amino-benzoic acid, melts at 187°–188° C. The yield was 70% of the theoretical yield on the basis of the ortho-chloro-benzoic acid used as a starting material.

EXAMPLE II

Nitration

Seventy-eight (78) parts (0.5 mole) of ortho-chloro-benzoic acid (M. P. 139°–140° C.) were dissolved in 40 parts of 98% sulfuric acid at 40°–45° C. The solution was cooled to 0° C., and 104 parts of mixed acid, containing 33.45% HNO3 and 66.55% H2SO4, were added slowly over a two-hour period at 0°–5° C. A slurry formed and the mass was agitated five hours longer at 0°–5° C. The whole was then drowned in 500 parts of ice and 250 parts of water and filtered at 25° C. The precipitate was washed three times with cold water and then dried in an oven at 65°–70° C. Dry weight 95 parts.

Reduction

The reduction of the 95 parts of the chloro-nitro-benzoic acid and the isolation of the resulting 2-chloro-5-amino-benzoic acid were carried out exactly as described in Example I. The yield was 58.7 parts of 2-chloro-5-amino-benzoic acid (67.8% of theoretical) which melted at 185°–186° C.

EXAMPLE III

Nitration

One hundred fifty-seven (157) parts of ortho-chloro-benzoic acid were dissolved in 800 parts of sulfuric acid (96%–C. P.) at 45°–50° C. The solution was held at 45°–50° C. and 207 parts of mixed acid containing 33.45% HNO3 and 66.55% H2SO4 were added during one hour. The solution was then heated to 70° C. and held at 70°–75° C. for two hours when it was drowned in 1400 parts of ice and water. The product was washed well with cold water, sucked dry and then dried at 65° C. One hundred ninety-six (196) parts of nitro body were obtained.

Reduction

Ninety-eight (98) parts of the above product were added slowly over a period of four hours to a liter of boiling water containing 100 parts of iron filings and 2 parts of glacial acetic acid. The mixture was kept at 95°–100° C. throughout the addition of the nitro body and was held at this temperature for three hours longer. A good blue spot was always obtained with potassium ferricyanide indicating the presence of ferrous ions during the reduction. The mixture was then made alkaline to Brilliant Yellow with 34 parts of Na2CO3 and boiled for thirty minutes before filtering. After filtering, the iron sludge was washed and the washings combined with the main filtrate. Thirteen (13) parts of sodium bisulfite (NaHSO3) were added to decolorize the solution and inhibit oxidation. The solution was evaporated to 12° Baumé, acidified to a pH of about 3.0, cooled to 10° C., and filtered. Forty-three (43) parts of 2-chloro-5-amino-benzoic acid (M. P. 182° C. to 184° C.) were obtained. Yield 51.8% of theoretical.

The conditions of nitration and reduction are subject to variation. For istance, the proportion of nitric acid in the nitrating acid may vary within relatively wide limits. However, the strong nitrating acids usually contain less nitric acid than other mineral acid such as sulfuric acid.

While low temperatures in the nitration (e. g., 0°–5° C.) are preferred because the crystallization of the nitro body from water gives a higher yield of 2-chloro-5-nitro-benzoic acid when the nitration has been made at 0°–5° C. than when it is made at higher temperatures (e. g., 15°–20° C.), it has been found, contrary to expectation, that nitration temperatures of 50°–70° C., although resulting in low yields of 2-chloro-5-amino-benzoic acid, still produce a product of satisfactory quality when the isolation is conducted within the preferred pH range.

The product is highly useful as an intermediate for the preparation of other compounds, e. g., dyes.

The preferred nitration process is advantageous in giving better yields of the desired product and also contributes to the purity of the product by keeping side reactions, e. g., the formation of 2-chloro-3-nitro-benzoic acid and 2-chloro-3:5-dinitro-benzoic acid, at a minimum. The method of isolation within a specific pH range increases the yield and quality of the product by permitting maximum separation of the desired product without separation of impurities even where relatively large amounts of impurities are present, as when the nitration is effected at high temperatures.

As many apparently widely different embodiments of this invention may be made without departing from the spirit and scope thereof, it is to be understood that I do not limit myself to the specific embodiments thereof except as defined in the appended claims.

I claim:

1. The process of producing 2-chloro-5-amino-benzoic acid which comprises nitrating ortho-chloro-benzoic acid, reducing the resulting chloro-nitro-benzoic acids to the corresponding chloro-amino-benzoic acids, and separating the 2-chloro-5-amino-benzoic acid from an aqueous acidic medium maintained at a pH within the range of 2.5 to 3.5.

2. The process of producing 2-chloro-5-amino-benzoic acid which comprises nitrating ortho-chloro-benzoic acid dissolved in concentrated sulfuric acid with a solution of nitric acid in sulfuric acid at a temperature of about 0° C. to about 5° C., reducing the resulting chloro-nitro-benzoic acids to the corresponding chloro-amino-benzoic acids in an iron reduction medium, separating the chloro-amino-benzoic acids dissolved in aqueous alkaline solution from the iron sludge, then acidifying said aqueous solution to a pH of within the range of 2.8 to 3.2, and recovering the precipitated 2-chloro-5-amino-benzoic acid.

3. In a process of producing 2-chloro-5-amino-benzoic acid, the step which comprises treating ortho-chloro-benzoic acid with a nitrating acid at a temperature not higher than about 5° C.

4. In a process of producing 2-choloro-5-amino-benzoic acid, the step which comprises isolating the 2-chloro-5-amino-benzoic acid from an aqueous solution of the reduction products of nitrated 2-chloro-benzoic-acid in which the pH is within the range of 2.5 to 3.5.

5. In a process of producing 2-chloro-5-amino-benzoic acid, the step which comprises isolating the 2-chloro-5-amino-benzoic acid from an aqueous solution of the reduction products of nitrated 2-chloro-benzoic-acid in which the pH is within the range of 2.8 to 3.2.

ROBERT FREEMAN DEESE, Jr.